United States Patent [19]
Caruso

[11] Patent Number: 5,592,298
[45] Date of Patent: Jan. 7, 1997

[54] APPARATUS AND METHOD FOR DETECTING DIGITIZED IMAGE AREA COVERAGE BY COUNTING PIXELS

[75] Inventor: Angelo T. Caruso, Rochester, N.Y.

[73] Assignee: Xerox Corporation, Stamford, Conn.

[21] Appl. No.: 253,796

[22] Filed: Jun. 3, 1994

[51] Int. Cl.[6] .............. H04N 1/387; H04N 1/40; G01D 15/14
[52] U.S. Cl. .............. 358/298; 358/448; 347/131
[58] Field of Search ............. 358/296, 298, 358/300, 401, 406, 448, 456, 501, 502, 504, 530, 534; 347/5–7, 19, 84, 131, 184, 232; 355/204, 208, 209, 246, 326 R, 327

[56] References Cited

U.S. PATENT DOCUMENTS

| | | | |
|---|---|---|---|
| 3,409,901 | 11/1968 | Dost et al. | 346/74 |
| 4,468,112 | 8/1984 | Suzuki et al. | 355/140 |
| 4,847,659 | 7/1989 | Resch, III | 355/202 |
| 4,908,666 | 3/1990 | Resch, III | 355/246 |
| 5,202,769 | 4/1993 | Suzuki | 358/300 |
| 5,204,698 | 4/1993 | LeSueur et al. | 346/160 |
| 5,204,699 | 4/1993 | Birnbaum et al. | 346/160 |
| 5,349,377 | 9/1994 | Gilliland et al. | 347/131 |
| 5,402,246 | 3/1995 | Seitz et al. | 358/299 |
| 5,471,313 | 11/1995 | Thieret et al. | 358/296 |

FOREIGN PATENT DOCUMENTS

| | | | |
|---|---|---|---|
| 0526197A2 | 3/1993 | European Pat. Off. | G06K 9/50 |
| 2153619A | 8/1985 | United Kingdom | H04N 1/40 |

OTHER PUBLICATIONS

Random Sample Consensus: A Paradigm for Model Fitting w/Applications to Image Analysis and Automated Cartography, Martin Fischler and Robert C. Bolles Communications of the ACM, vol. 24, No. 6, Jun. 1981, pp. 381–395.

*Primary Examiner*—Eric Frahm
*Attorney, Agent, or Firm*—Don L. Webber

[57] ABSTRACT

A system for estimating pixel coverage in a digitized image including a controller for sampling pixels in a byte stream according to a varying spaced sampling mode so as to avoid image pattern errors. A processor for sums the sampled pixels, so that a total pixel on count in the digitized image may be estimated. A plurality of pixels may be included in bytes in the data stream; a look-up table, random number generator or other device may be used to select the addresses of the bytes to be sampled in the byte stream. The system may include an ink metering controller for providing ink to a printer or a printer service status indicator for providing various forms of printer consumable and component service data.

26 Claims, 4 Drawing Sheets

5,592,298

APPARATUS AND METHOD FOR DETECTING DIGITIZED IMAGE AREA COVERAGE BY COUNTING PIXELS

BACKGROUND OF THE INVENTION

The disclosed apparatus and method provides a efficient, low cost system for more accurate digitized image coverage area sampling for use in an electronic printers, copiers computers or other electronic imaging device. In particular, the apparatus and method of the present invention are highly useful to predict imaging ink/toner and other consumable material depletion, service and maintenance requirements in a printer or copier.

As will be further described herein, the digitized image sampling system of the present invention can accurately estimate cumulative pixel "on" or "activated" totals in a data stream, so as to predict, estimate and/or manage, for example, toner/ink usage in printers, copiers or other electronic imaging devices (hereinafter, "printers"). The disclosed system can be utilized with any printer, to reduce sensor physical condition costs, improve printer reliability, or other reasons. The disclosed exemplary system is an improvement over other pixel (image bit or byte) counting methods that might be used to determine print engine ink/toner usage and/or to measure or monitor other aspects of printing operations.

A feature of specific embodiments of the present invention disclosed herein is to provide an improved system for accurately estimating consumption of imaging materials (inks, toners, carriers, oils, etc.) as well as service and maintenance requirements in a printer that can be measured or predicted in relation to the digital pixels which are being used to generate the various images in a data (byte) stream. Unlike a system that might unsuccessfully avoid errors caused by image patterns, repetitive effects, byte/pixel frequency sets or other data or pixel stream artifacts that can result in inaccurate pixel estimations or determinations, the present system limits if not eliminates the occurrence such errors. Even when digitally compressed images are sampled, the system of the present invention can permit accurate analysis of the sampled pixels in the data stream. Devices and methods of pixel on/off weighing, gray scale/halftone detection and other systems rely on pixel counting system total image pixel count systems. By way of background, pending Xerox Corporation U.S. application Ser. No. 08/062,971, now U.S. Pat. No. 5,349,377, filed May 17, 1993 (D/93150), entitled, "Printer Toner Usage Indicator With Image Weighted Calculation ", by Keith Gilliland, et al. and disclosures cited therein, are directed to such systems that rely on pixel counting and/or frequency monitoring in applying weighing factors in making toner use determinations.

The following disclosures may be relevant to various aspects of the present invention:

U.S. Pat. No. 5,204,699
Patentee: Birnbaum et al.
Issued: Apr. 20, 1993
U.S. Pat. No. 5,204,698
Patentee: LeSueur et al.
Issued: Apr. 20, 1993
U.S. Pat. No. 4,908,666
Patentee: Resch, III
Issued: Mar. 13, 1990
U.S. Pat. No. 4,847,659
Patentee: Resch, III
Issued: Jul. 11, 1989
U.S. Pat. No. 4,468,112
Patentee: Suzuki et al.
Issued: Aug. 28, 1984
U.S. Pat. No. 3,409,901
Patentee: M. H. Dost et al.
Issued: Nov. 5, 1968
EP-0 526 197 A2
Patentee: Huttenlocher et al.
Published: Mar. 2, 1993
GB-2 153 619 A
Patentee: M. H. Dost et al.
Issued: Aug. 21, 1985

"Random Sample Consensus: A Paradigm for Model Fitting with Applications to Image Analysis and Automated Cartography,"

Authors: M. A. Fischler and R. C. Bolles *Communications of the ACM,* Vol. 24, No. 6, June 1981, pp. 381–395.

The relevant portions of the foregoing disclosures may be briefly summarized as follows:

U.S. Pat. No. 5,204,699 discloses an apparatus and method adaptable for use in a printing system, to measure the mass of toner developed on an electrostatic latent image produced therein. Toner usage of a printer is approximated as a function of the gray scale value of the image signal used to generate a pixel. The toner mass measuring apparatus sums a plurality of individual toner mass signals, generated as a function of the image intensity signals, to approximate the toner mass used to develop the electrostatic latent image. The particular function employed may be linear or nonlinear, depending upon the xerographic engine characteristics. The system herein can also be used with, or incorporate, said additional weighting for said assigned gray scale value, where the printer is one in which the pixels do have a (varying) gray scale value.

U.S. Pat. No. 5,204,698 discloses a laser printer in which a latent image is generated on a circulating imaging member in accordance with digital image signals and subsequently developed with toner, the number of pixels to be toned is used as an indication of the rate at which toner is being depleted from the developer mixture. The device for dispensing fresh toner to the developer mixture is operated in dependence on the number of pixels to be toned, according to a pixel counter. If toner dispensing efficiency falls, the preestablished relationship is adjusted so that the toner density in the developed images remains constant. If a predetermined level of adjustment is reached, it is taken as an indication that the supply of toner in the printer is low, and should be replenished.

U.S. Pat. No. 4,908,666 discloses a toner replenishment control structure for developer materials, in which two toner types are employed. On toner type exhibits toning contrast characteristics which vary predictably with the concentration of toner particles in the developer mix, while the other toner type does not exhibit predictable changes in toning contrast as the toner concentration changes. An electrostatographic machine produces a contrast signal having a value proportional to toning contrast and a concentration signal having a value indicative of the ratio of toner to carrier in the mix, the concentration signal being substantially insensitive to the toning contrast. The system actuates replenishment of toner of the first type according to the value of the contrast signal and actuates replenishment of toner of the second type according to the value of said concentration signal.

U.S. Pat. No. 4,847,659 discloses an electrostatographic machine which replenishes the toner in a developer mix proportionally in response to a toner depletion signal having a value indicative of the rate of toner usage. A second signal is produced having a value proportional to toning contrast; and the contrast of proportionality between toner replenishment and the depletion signal is adjusted in response to the second signal value. A toner replenishment controller determines toner usage according to indicative counted pages, characters or pixels to be toned.

U.S. Pat. No. 4,468,112 discloses a device for controlling the developer concentration in an electrophotographic copier or the like in which one detector determines developer concentration and a second detector that determines image density are utilized for controlling process devices such as toner dispensers to maintain a printed image density.

U.S. Pat. No. 3,409,901 discloses a xerographic system in which toner is dispensed according to print density and area. A cathode ray tube beam current, proportional to print density and area, drives a toner concentration control system which feeds toner to the developing mechanism. When the beam current exceeds a threshold, a batch of toner is released to the developer mechanism and the system is reset. A predetermined batch size may be made variable such that when the toner level in the feed box is high, the threshold which must be exceeded is relatively high, while if the toner level is low the threshold which must be exceeded is relatively low.

EP-0 526 197 A2, based on pending U.S. application Ser. No. 07/737,956 filed Jul. 30, 1991, discloses an image processing method wherein random or pseudo-random sampling is used to analyze an image to determine attributes such as skew, typeface, and character size and spacing. The number of sampled locations is smaller than the number of locations on the page but must be statistically significant. For example, 1000 samples may be required to determine skew or font, while 5000 samples may be sufficient to measure horizontal or vertical distances. Images may be segmented for characteristic measurement, such as for words or paragraphs.

GB 2 153 619A discloses an image processing apparatus capable of image discrimination, such as to produce accurate half-tone or picture image data. Generally, a threshold is applied to the image data at a certain level, and subsequent to thresholding the number of transitions from light to dark within a small area (block) is counted. The system operates on the presumption that data with a low number of transitions after thresholding is probably a high frequency half-tone or continuous tone image. In one embodiment, image data is processed in 8×8 blocks; the density of each pixel is "binarized," and the transitions of neighboring pixels is summed. The summed value is compared to predetermined values to discriminate the nature of the image. If the sum is below the low value, it is dithered; if between the values, it is passed without processing; if above the higher value, it is discriminated as a dot image area, and its block pixel densities are averaged and coded. Other embodiments present variations of this process.

The publication by Fischler and Bolles discloses a paradigm capable of interpreting/smoothing data containing gross errors for applications in automated image analysis. The disclosed Random Sample Consensus paradigm may be applied to the image location determination problem, such as may be encountered in automated cartography applications, scanner/image analysis and the like.

SUMMARY OF THE INVENTION

In accordance with one aspect of the present invention, there is provided an apparatus for estimating pixel coverage in a digitized image, including a controller for sampling pixels in a byte stream according to a varied spacing mode so as to avoid image pattern errors and a processor for summing said pixels in the sampled bytes, whereby the processor provides an estimate of a total pixel on count in the digitized image.

In accordance with another aspect of the present invention, there is provided an apparatus for printing digitized images on sheets including a system for estimating pixel coverage in the digitized images. The system includes a controller for sampling pixels in a byte stream according to a varied spacing mode so as to avoid image pattern errors and a processor for summing said pixels in the sampled bytes, whereby the processor provides an estimate of a total pixel on count in the digitized image.

In accordance with another aspect of the present invention, there is provided a method for estimating pixel coverage in a digitized image, including the step of sampling pixels in a byte stream according to a varied spacing mode so as to avoid image pattern errors and the step of summing the pixels in the sampled bytes, whereby the processor provides an estimate of a total pixel on count in the digitized image.

BRIEF DESCRIPTION OF THE DRAWINGS

Various features and advantages will be apparent from the specific apparatus and its operation described in the example below, as well as the claims. Thus, the present invention will be better understood from this description of this embodiment thereof, including the drawing figures, wherein:

While the present invention will hereinafter be described in connection with preferred embodiments thereof, it will be understood that it is not intended to limit the invention to these embodiments. On the contrary, it is intended to cover all alternatives, modifications and equivalents, as may be included within the spirit and scope of the invention as defined by the appended claims.

DESCRIPTION OF THE PREFERRED EMBODIMENTS

Figure 4:
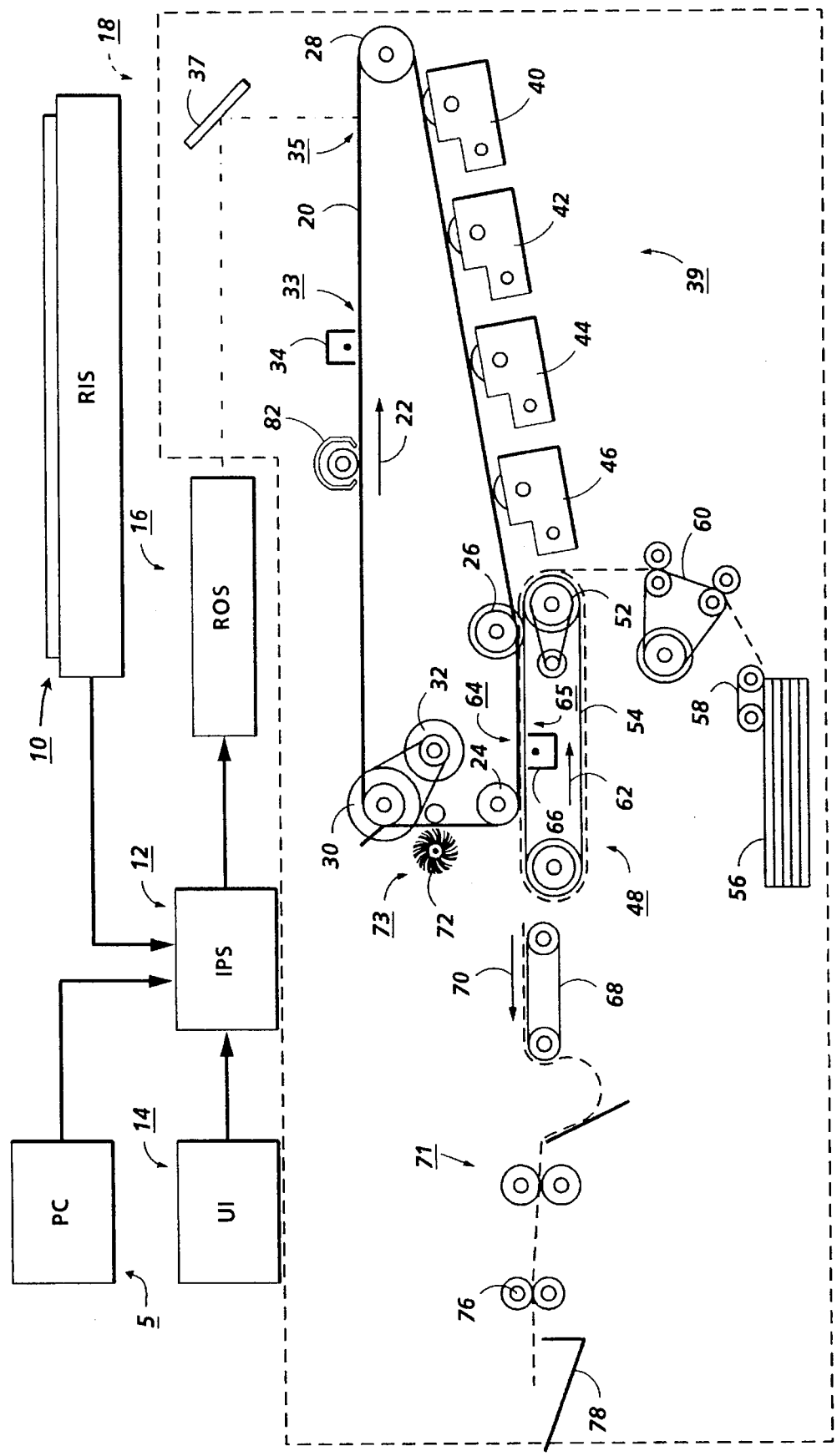
FIG. 4 is a schematic elevational view showing an exemplary electrophotographic printing machine incorporating features of the present invention therein.

For a general understanding of the features of the present invention, reference is made to the drawings. FIG. 4 is a schematic elevational view showing an exemplary electrophotographic printing machine and which may incorporate features of the present invention therein. It will become evident from the following discussion that the sampling system of the present invention is equally well suited for use in a wide variety of printing and copying systems, and therefore is not limited in application to the particular system(s) shown and described herein. While the present invention will hereinafter be described in connection with preferred embodiments, it will be understood that it is not intended to limit the invention to a particular embodiment. On the contrary, it is intended to cover all alternatives, modifications and equivalents as may be included within the spirit and scope of the invention as defined by the appended claims.

To begin by way of general explanation, FIG. 4 is a schematic elevational view showing an electrophotographic printing machine which may incorporate features of the present invention therein. An image processing station (IPS), indicated generally by the reference numeral 12, contains data processing and control electronics which prepare and manage the image data flow to a raster output scanner (ROS), indicated generally by the reference numeral 16. A user interface (UI), indicated generally by the reference numeral 14, is also in communication with IPS 12. A personal computer (PC), indicated generally by the reference numeral 5, may also interface with IPS 12 and thereafter, with other components of the electrophotographic printing machine.

UI 14 enables an operator to control and monitor various operator adjustable functions and maintenance activities. The operator actuates the appropriate keys of UI 14 to adjust the parameters of the copy. UI 14 may be a touch screen, or any other suitable control panel, providing an operator interface with the system. The output signal from UI 14 is transmitted to IPS 12. UI 14 may also display electronic documents on a display screen (not shown in FIG. 9), as well as display all or certain relevant service/consumable status information in accordance with the present invention as described in association with FIGS. 1 through 3 below.

As further shown in FIG. 4, a multiple color original document 38 may be positioned on (optional) raster input scanner (RIS), indicated generally by the reference numeral 10. The RIS contains document illumination lamps, optics, a mechanical scanning drive, and a charge coupled device (CCD array) or full width color scanning array. RIS 10 captures the entire image from original document 38 and converts it to a series of raster scan lines and moreover measures a set of primary color densities, i.e., red, green and blue densities, at each point of the original document. RIS 10 may provide data on the scanned image to IPS 12.

Digitized electronic documents may be created, modified, stored and/or otherwise processed by IPS 12 for printing on printer 18. IPS 12 processor(s) and controller(s), to include those managing relevant printer ink dispensing, maintenance and service status information. IPS 12 may provide digitized image byte/pixel sampling according to the present invention as described in greater detail in association with FIGS. 1 through 3 below.

IPS 12 also may transmits signals corresponding to the desired electronic or scanned image to ROS 16, which creates the output copy image. ROS 16 includes a laser with rotating polygon mirror blocks. The ROS illuminates, via mirror 37, the charged portion of a photoconductive belt 20 of a printer or marking engine, indicated generally by the reference numeral 18, at a rate of about 400 pixels per inch, to achieve a set of subtractive primary latent images. The ROS will expose the photoconductive belt to record three or four latent images which correspond to the signals transmitted from IPS 12. One latent image is developed with cyan developer material. Another latent image is developed with magenta developer material and the third latent image is developed with yellow developer material. A black latent image may be developed in lieu of or in addition to other (colored) latent images. These developed images are transferred to a copy sheet in superimposed registration with one another to form a multicolored image on the copy sheet. This multicolored image is then fused to the copy sheet forming a color copy.

With continued reference to FIG. 4, printer or marking engine 18 is an electrophotographic printing machine. Photoconductive belt 20 of marking engine 18 is preferably made from a photoconductive material. The photoconductive belt moves in the direction of arrow 22 to advance successive portions of the photoconductive surface sequentially through the various processing stations disposed about the path of movement thereof. Photoconductive belt 20 is entrained about rollers 24 and 26, tensioning roller 28, and drive roller 30. Drive roller 30 is rotated by a motor 32 coupled thereto by suitable means such as a belt drive. As roller 30 rotates, it advances belt 20 in the direction of arrow 22.

Initially, a portion of photoconductive belt 20 passes through a charging station, indicated generally by the reference numeral 33. At charging station 33, a corona generating device 34 charges photoconductive belt 20 to a relatively high, substantially uniform potential.

Next, the charged photoconductive surface is rotated to an exposure station, indicated generally by the reference numeral 35. Exposure station 35 receives a modulated light beam corresponding to information derived by RIS 10 having multicolored original document 38 positioned thereat. The modulated light beam impinges on the surface of photoconductive belt 20. The beam illuminates the charged portion of the photoconductive belt to form an electrostatic latent image. The photoconductive belt is exposed three or four times to record three or four latent images thereon.

After the electrostatic latent images have been recorded on photoconductive belt 20, the belt advances such latent images to a development station, indicated generally by the reference numeral 39. The development station includes four individual developer units indicated by reference numerals 40, 42, 44 and 46. The developer units are of a type generally referred to in the art as "magnetic brush development units." Typically, a magnetic brush development system employs a magnetizable developer material including magnetic carrier granules having toner particles adhering triboelectrically thereto. The dispensing of toner to each developer may be controlled by the digitized image byte/pixel sampling system of the present invention, again as described in greater detail in association with FIGS. 1 through 3 below. The developer material is continually brought through a directional flux field to form a brush of developer material. The developer material is constantly moving so as to continually provide the brush with fresh developer material. Development is achieved by bringing the brush of developer material into contact with the photoconductive surface. Developer units 40, 42, and 44, respectively, apply toner particles of a specific color which corresponds to the complement of the specific color separated electrostatic latent image recorded on the photoconductive surface.

The color of each of the toner particles is adapted to absorb light within a preselected spectral region of the electromagnetic wave spectrum. For example, an electrostatic latent image formed by discharging the portions of charge on the photoconductive belt corresponding to the green regions of the original document will record the red and blue portions as areas of relatively high charge density on photoconductive belt 20, while the green areas will be reduced to a voltage level ineffective for development. The charged areas are then made visible by having developer unit 40 apply green absorbing (magenta) toner particles onto the electrostatic latent image recorded on photoconductive belt 20. Similarly, a blue separation is developed by developer unit 42 with blue absorbing (yellow) toner particles, while the red separation is developed by developer unit 44 with red absorbing (cyan) toner particles. Developer unit 46 contains black toner particles and may be used to develop the electrostatic latent image formed from a black and white original document. Each of the developer units is moved into and out of an operative position. In the operative position, the magnetic brush is substantially adjacent the photoconductive belt, while in the nonoperative position, the magnetic brush is spaced therefrom. During development of each electrostatic latent image, only one developer unit is in the operative position, the remaining developer units are in the nonoperative position. A variety of sensors (not shown in FIG. 4) may be incorporated into the developer units to indicate toner levels, carrier particle levels and a variety of other aspects of developer operation as described in greater detail in association with FIGS. 1 through 3 below.

After development, the toner image is moved to a transfer station, indicated generally by the reference numeral 65. Transfer station 65 includes a transfer zone, generally indicated by reference numeral 64. In transfer zone 64, the toner image is transferred to a sheet of support material, such as plain paper amongst others. At transfer station 65, a sheet transport apparatus, indicated generally by the reference numeral 48, moves the sheet into contact with photoconductive belt 20. Sheet transport 48 has a pair of spaced belts 54 entrained about a pair of substantially cylindrical rollers 50 and 52. A sheet gripper (not shown in FIG. 4) extends between belts 54 and moves in unison therewith. A sheet 25 is advanced from a stack of sheets 56 disposed on a tray. A friction retard feeder 58 advances the uppermost sheet from stack 56 onto a pretransfer transport 60. Transport 60 advances the sheet (not shown in FIG. 4) to sheet transport 48. The sheet is advanced by transport 60 in synchronism with the movement of the sheet gripper. In this way, the leading edge of the sheet arrives at a 10 reselected position or loading zone to be received by the open sheet gripper. The sheet gripper then closes securing the sheet thereto for movement therewith in a recirculating path. The leading edge of the sheet (again, not shown in FIG. 4) is secured releasably by the sheet gripper. As belts 54 move in the direction of arrow 62, the sheet moves into contact with the photoconductive belt, in synchronism with the toner image developed thereon. In transfer zone 64, a corona generating device 66 sprays ions onto the backside of the sheet so as to charge the sheet to the proper magnitude and polarity for attracting the toner image from photoconductive belt 20 thereto. The sheet remains secured to the sheet gripper so as to move in a recirculating path for three cycles. In this way, three or four different color toner images are transferred to the sheet in superimposed registration with one another.

One skilled in the art will appreciate that the sheet may move in a recirculating path for four cycles when under color black removal is used. Each of the electrostatic latent images recorded on the photoconductive surface is developed with the appropriately colored toner and transferred, in superimposed registration with one another, to the sheet to form the multicolored copy of the colored original document.

After the last transfer operation, the sheet transport system directs the sheet to a vacuum conveyor 68. Vacuum conveyor 68 transports the sheet, in the direction of arrow 70, to a fusing station, indicated generally by the reference numeral 71, where the transferred toner image is permanently fused to the sheet. A variety of sensors (not shown in FIG. 3) may be incorporated into the fuser to indicate fuser oil levels, service/maintenance requirements and a variety of other aspects of fuser operation as described in greater detail in association with FIGS. 1 through 3 below. Thereafter, the sheet is advanced by a pair of rolls 76 to a catch tray 78 for subsequent removal therefrom by the machine operator.

The final processing station in the direction of movement of belt 20, as indicated by arrow 22, is a photoreceptor cleaning apparatus, indicated generally by the reference numeral 73. A rotatably mounted fibrous brush 72 may be positioned in the cleaning station and maintained in contact with photoconductive belt 20 to remove residual toner particles remaining after the transfer operation, which may be deposited in a waste container (not shown in FIG. 4). A variety of sensors (also not shown in FIG. 4) may be incorporated into the photoreceptor cleaning apparatus and waste container to indicate service requirements described in greater detail in association with FIGS. 1 through 3 below. Thereafter, lamp 82 illuminates photoconductive belt 20 to remove any residual charge remaining thereon prior to the start of the next successive cycle.

The pixel/byte sampling system of the present invention may be used to dispense inks in a variety of printing machines, to include liquid inks used in liquid ink printing machines. Other printer systems may also rely on the pixel/byte sampling system of the present invention described in greater detail below to monitor or indicate a variety of printer service and maintenance requirements.

Figure 1:
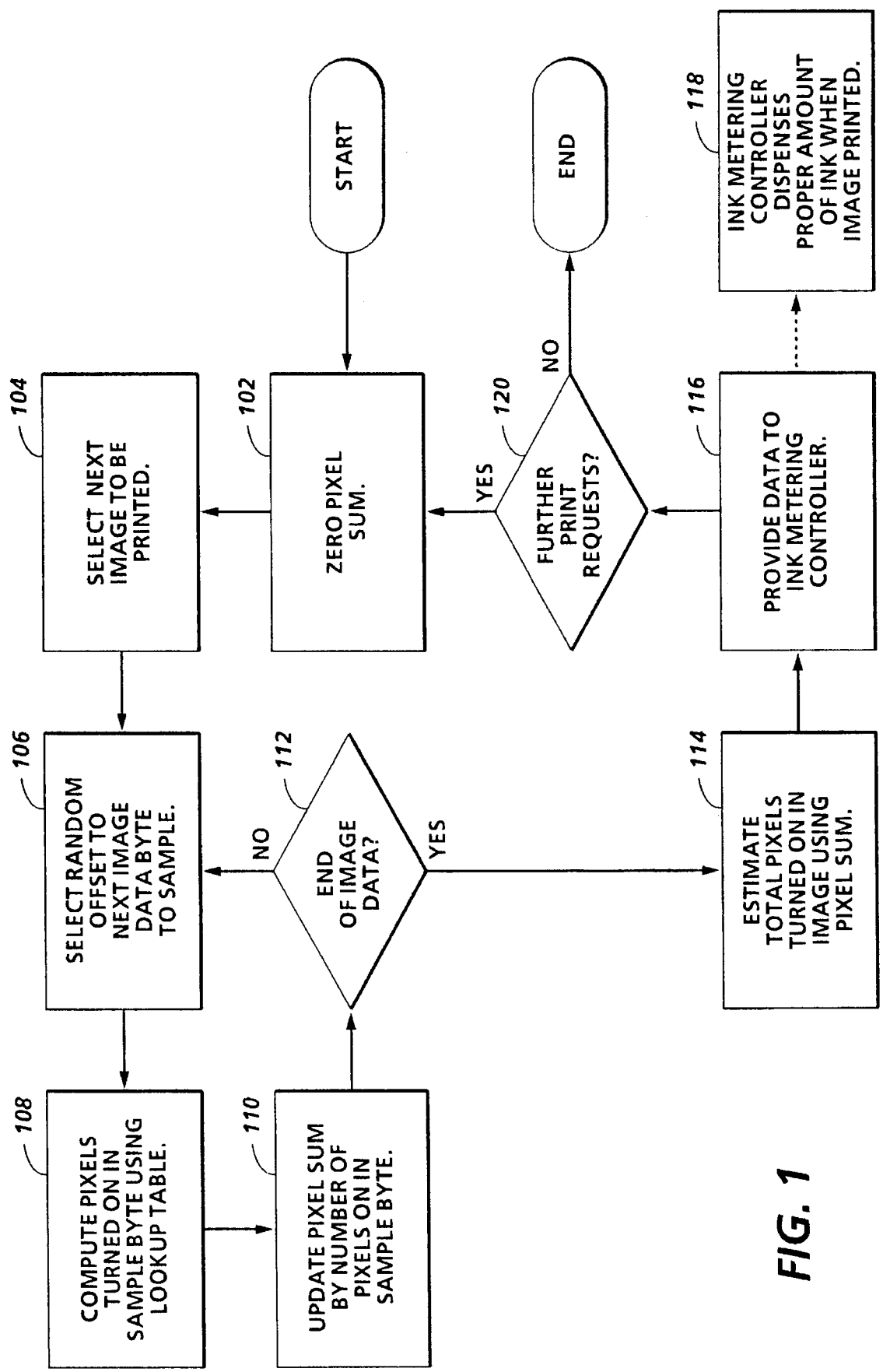
FIG. 1 is a flow diagram showing one embodiment of a sampling system of the present invention.

FIG. 1 is a flowchart showing one exemplary pixel/byte sampling system (the "system") of the present invention. The system may be executed by the processors and controllers of a printer IPS, such as described in association with the printer of in FIG. 4, or be carried out by a separate processors and controllers (not shown in FIG. 4).

In accordance with the system of the present invention, digitized electronic image data is sampled at random or quasi-random "locations," that is, from the bytes of the electronic document (from an electronically assembled document, a digitally scanned image, or the like). The byte samples may be rapidly collected and processed, so as to estimate toner coverage for the entire digitized image. Liquid ink printing systems may employ the image data sampling system of the present invention in ways similar and beyond the toner/dry ink systems described more fully herein. The sampled image data may thereafter be used by a controller to meter ink from a printer or copier ink hopper into a developer housing for application to a latent image on a photoreceptor. The information may also be used by a controller to, based on a predetermined/known capacity of an ink hopper, to indicate to a user the remaining ink in the hopper. The information may also be used to control a decurler (not shown in FIG. 4), by relaying the amount of toner (and related decurling requirements) to a sheet decurler for improved out sheet quality. In still other applications, the sampled data may be assembled by a compiler so as to warn or indicate when developer housings, photoreceptors, waste and/or cleaning systems as well as other printer components and systems might require maintenance or service, to include when physical condition sensors (electrical, optical, etc.) fail.

In addition, other important benefits may result from employing the system of the present invention. For example, the need for physical condition sensors (toner level, fuser oil level, waste and cleaning system, etc.) can be reduced or eliminated by the inherently more reliable use of digital data to predict printer consumable expenditures and service requirements. Machine production costs and service requirements related to such physical condition sensors can also be reduced, even if the system of the present invention is used to merely supplement those sensors. Maintenance and service requirement information may assembled and provided to a users, service technicians or others to track and machine requirements and enhance performance. Likewise, the system of the present system can drive a warning system for alerting that a toner, developer, fuser, photoreceptor or other technician or customer in a degraded operation or failure condition. The advantages of the byte/pixel sampling system of the present invention can also include improved and consistent print quality, reduced down time/service delay through preventative maintenance warnings, less risk of potentially costly machine failures and otherwise improved cost effectiveness and efficiency of the printer or copier to which it is applied.

By only sampling the total quantity of available digitized image data, processor capacity and capability requirements can be lessened and made more rapid, while sufficiently accurate and more timely ink/toner usage and other printer component utilization data is obtained, distributed and used. Further, accurate, real time processing of the sampled data is enabled in less costly, lower capacity processors, such that such functions to include proper developer toner concentrations and other tasks outlined above can to be continuously and accurately monitored in a digital printer. By sampling the image at random locations, rather than uniformly, the error introduced by repeating patterns in the image is reduced. The implementation of random sampling may be accomplished using a quasi-random look-up table, a random number or address generator or other sample spacing means which may be likewise optimized for efficient realtime use, while avoiding miscalculation and error-prone estimation caused by systems that fail to account for image patterns or other repetitive imaging effects. Preferably, when a look-up table or quasi-random address sampling system is used, the starting or entry point into the table or set of bytes to be sampled is altered or staggered, such as the point of the image or set of data points (such as a region or string of bytes in an electronic document) will not result in increased sampling error. A recurring pattern or pixel structure of an electronic document, certain font byte/pixel addressing tendencies, or other electronic document attributes could cause a patterned sampling system to introduce error into a sampling scheme.

In certain embodiments of the present invention such as shown in FIG. 1, a quasi-random look-up table or LUT may be used to sample a digitized image, such as to determine toner coverage (or other aspect of printer operation, such as mentioned above). It is assumed for sampling purposes that the digitized image is represented as a collection of scan lines of fixed width, such as is typically how image data is prepared for laser printing. Toner densities can be evaluated on a variable or on a "banded" scale (such as by selecting target toner use ranges of 0–30%, 30–50%, 50–70% and 70–100% ) in determining anticipated ranges of toner application/release called for in printing a particular sampled image. The sampling system of the present invention varyingly selects scan lines over the length (y direction) of the image or page. The sampling system also varyingly selects bytes of image data over the width (x direction) of each of the selected y direction scan lines. The fraction of pixels turned on in all sampled bytes is used as the estimate image coverage. This image coverage information may be used, for example, to determine how much of the page which will be covered with ink or for other purposes.

The embodiment of the present invention shown in FIG. 1 requires that the image is digitally stored in memory or otherwise as a contiguous collection (y) of scan lines of fixed width (x). Modifications may also be employed so as to permit image data to be stored in a non-contiguous memory arrangement. (In certain other embodiments not shown, compressed or decompressed job to be sampled can be partitioned, divided, compressed or and otherwise handled or manipulated to further decrease the required memory and processing capabilities, to more efficiently and effectively employ system capabilities and capacities, or other reasons.) In the case of compressed or otherwise manipulated jobs or data streams, the pixel/byte sampling system may be initialized to read or detect the compression "code" or data system employed, so as to sample bytes therein according to the spatially varied system employed by the present invention.

With continued reference to the FIG. 1 flowchart, once the byte/pixel sampling system is started, the pixel summing collector is zeroed such as shown in block 102. According to block 104, the next image to be printed is selected, after which according to block 10 the random offset to the next image data to sample is selected. Thereafter, according to block 108, the number of pixels turned on (or inked in) in the sample byte is computed using the look-up table. Thereafter, according to block 110 the pixel sum collector is updated by the number of pixels on in the sample byte. According to decision block 112, if the end of the image data has been reached, the sampled total or estimate of the total pixels turned on in the image is summed. Thereafter, according to the controller, data is provided to an ink/toner metering controller for dispensing the requisite amount of ink. A command is forwarded to print the image, according to block 118 the ink metering controller dispenses the required amount of ink to complete the image.

The variables employed in the byte/pixel sampling system of the present invention as employed according to the FIG. 1 flowchart may be defined as follows:

PI=address in memory of the first byte of image data;

PY=address of the current scan line;

PX=address of the current byte of image data;

S=total number of scans in the image;

W=width of scan line in bytes;

P=total number of pixels turned on (or inked/toned);

X=a random variable vv/sample values x and mean value $\bar{x}$, approximately uniformly distributed between:

$$\frac{1}{2}\bar{x} \text{ and } \frac{3}{2}\bar{x}; \text{ and}$$

Y=a random variable w/sample values y and mean value $\bar{y}$, approximately uniformly distributed between:

$$\frac{1}{2}\bar{y} \text{ and } \frac{3}{2}\bar{y}.$$

For each data/digitized image, the pixel on (and ink coverage) estimation calculation algorithm may be expressed as follows:

```
PY = PI
P = 0
Loop over scan lines
    PY = PY + W*y
    IF PY > (PI + W*S), then exit scan lines loop
    PX = PY
    Loop over image data bytes
        PX = PX + x
        If PX > (PY + W) then exit image data byte loop
        P = P + (number of pixels turned on in byte address
            by PX)
    End loop over image data bytes
End loop over scan lines
Portion of image covered in toner/ink =
```

$$\frac{P}{(W/\bar{x})*(S/\bar{y})*8}$$

In order to accelerate the system for realtime efficiency, the random variables are chosen with $\bar{x}$ and $\bar{y}$ such the total number of samples is a small fraction or percentage of the total image data. The look-up table (LUT) may used for selecting both random variables (sampled bytes), whereby the pixels on are counted in each byte. (If desired, a look-up table or other method might also be used to sample pixels within each byte.)

The random or quasi-random sampling variable table may be generated a priori using a psuedo-random number generator. The system chooses the next entry in the table each time a random sample is needed. The look-up table sizes are preferably small (or far less than size of the entire image) so that the sets of random samples are reused (such as on a staggered restart basis) numerous times in the course of sampling a single image. One method to avoid error-prone sampling is to begin each subsequent cycle (n+1, n=2, etc.) through the look-up table by starting with a different (such as next) look-up table entry upon each reuse of the look-up table.

In a specific embodiment, the byte/pixel sampling system may utilize a LUT having 256 entries. Indexing this table according to each sampled image data byte yields the total number of pixels turned on in that byte. In a specific embodiment, the following sampling rates may be used:

$\bar{x}$=9.76 bytes and $\bar{y}$=71.4 scan lines.

At 300 dots per inch, the resulting sampled image grid effectively estimates pixel coverage of an image. In byte systems having eight pixels, these eight pixels are sampled simultaneously. For an 8.5×11 inch page at 300 dpi, these values of $\bar{x}$ and $\bar{y}$ result in sampling of only 0.14% of the total digital image data.

The optimum $\bar{x}$ and $\bar{y}$ for a given print engine are the largest possible values which yield a sufficiently accurate sample to maintain desired print quality. For example, a random look-up table, random number generator or similar system might sample 12,000 bytes on an 8.5 by 11 inch page containing 8 million bytes. For example, sampling of an average of 3.8 bytes per inch in the x direction and 4 scan lines per inch in the y direction is shown to result in typical sampling error (deviation) rates that are able to control the dispensing of ink to a developer with more than sufficient accuracy and reliability. When higher (or lower) sampling accuracy is required, the sampling frequency/density and other factors can be appropriately altered so as to meet the desired attributes of a particular application.

In certain situations, such as when a sampling system is able to detect particularly high toner use of a particular nature during printing, the higher processing speed that can be attained with such a sampling system (rather than a system that might " counts bytes or pixels) and can result in improved results over such a system. A color printer may serially employ one system of the present invention to dispense each ink to each respective developer (see FIGS. 1 and 4). For example, if a twenty page or multiple print document to be printed in color will require that high levels of cyan toner will be used, the sampling system of the present invention can complete the sampling task well before the sheet is to be physically printed. In such a situation, a limited toner capacity developer housing (such as all are) can "cycle up" to the larger amounts of prepared (charged, mixed, and so on) toner to be used well in advance of the actual engagement of the developer with the latent image on the photoreceptor, and/or well in advance of the pages or regions to be printed. In another example, a lengthy or high toner usage job could be detected in advance of printing as exceeding the remaining toner or ink supply in the printer, such that rather than starting the job, ink might be added to prevent interruption of the print job (which could result in inconsistent printing, color incongruities, printing delays, and may other undesirable effects). As such, in both single or multiple color printing applications ranging from larger, high speed machines to more compact, lower cost machines, improved print quality can result form the more rapid and efficient image data sampling system of the present invention. The system of the present invention can also provide substantial hardware cost savings, and repair or maintenance cost savings, as compared to other "low toner" or "out of toner" sensor systems which require optical, sonic, torque, weight or other sensors in or associated with the toner supply or dispenser, and associated wiring.

Figure 2:
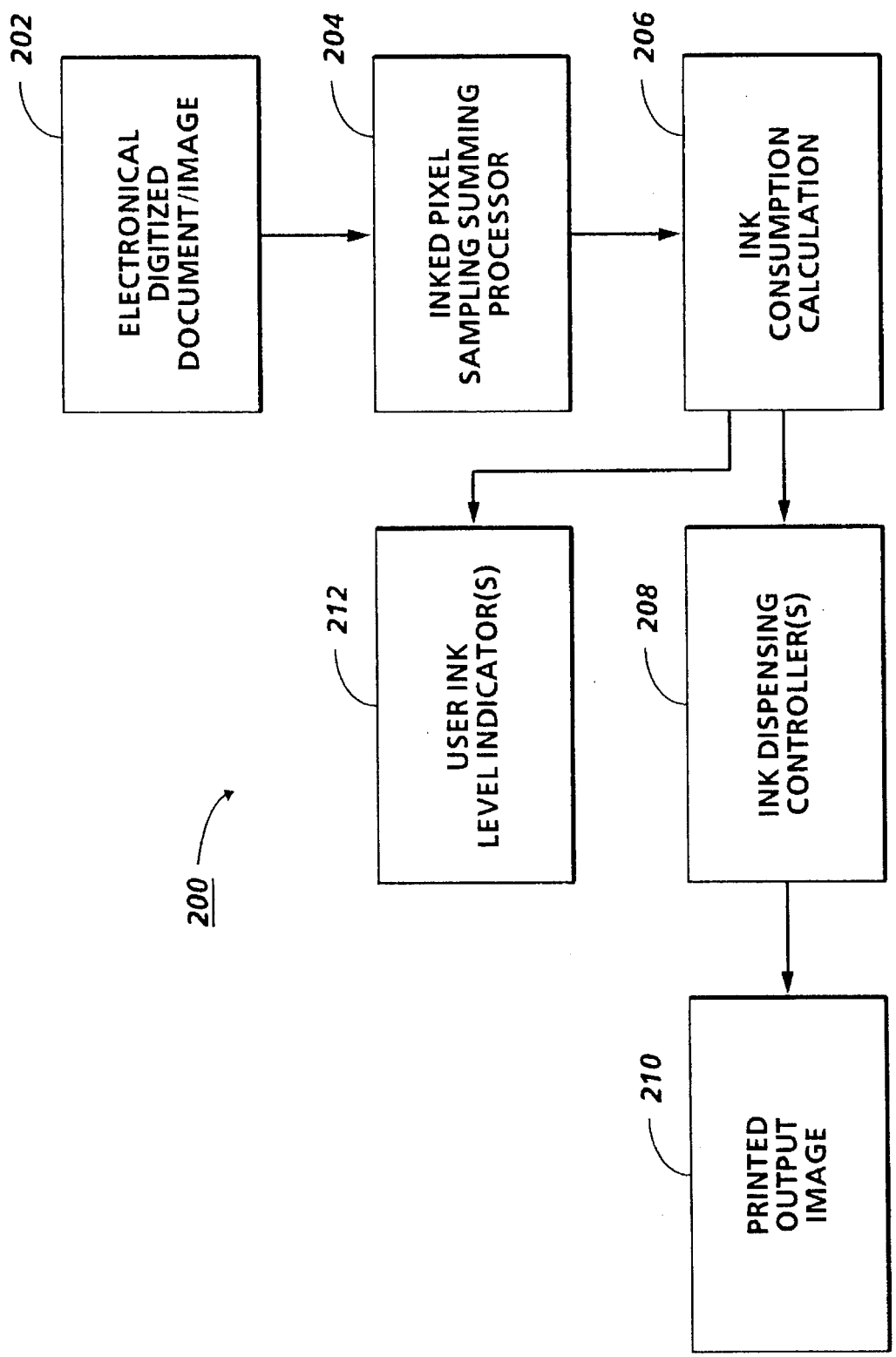
FIG. 2 is a block diagram showing another embodiment of a sampling system of the present invention.

FIG. 2 shows a block diagram illustrating the general information flow of an embodiment of the present invention, so as to result in a properly inked output image. Image byte/pixel sampling system 200 shows the data steam from electronic digitized document image represented by block 202, whereby the sampled byte/pixel information is provided to the inked pixel sampling summing processor indicated by block 204. Thereafter, the printer ink consumption calculation is performed by a processor represented by block 206. Information from the ink consumption calculation processor is provided to the ink dispensing controllers, block 208 and to the user ink level indicators block 212. The printed output image represented by block 210 results from the correctly dispensed amounts of ink from the dispensing controllers.

Figure 3:
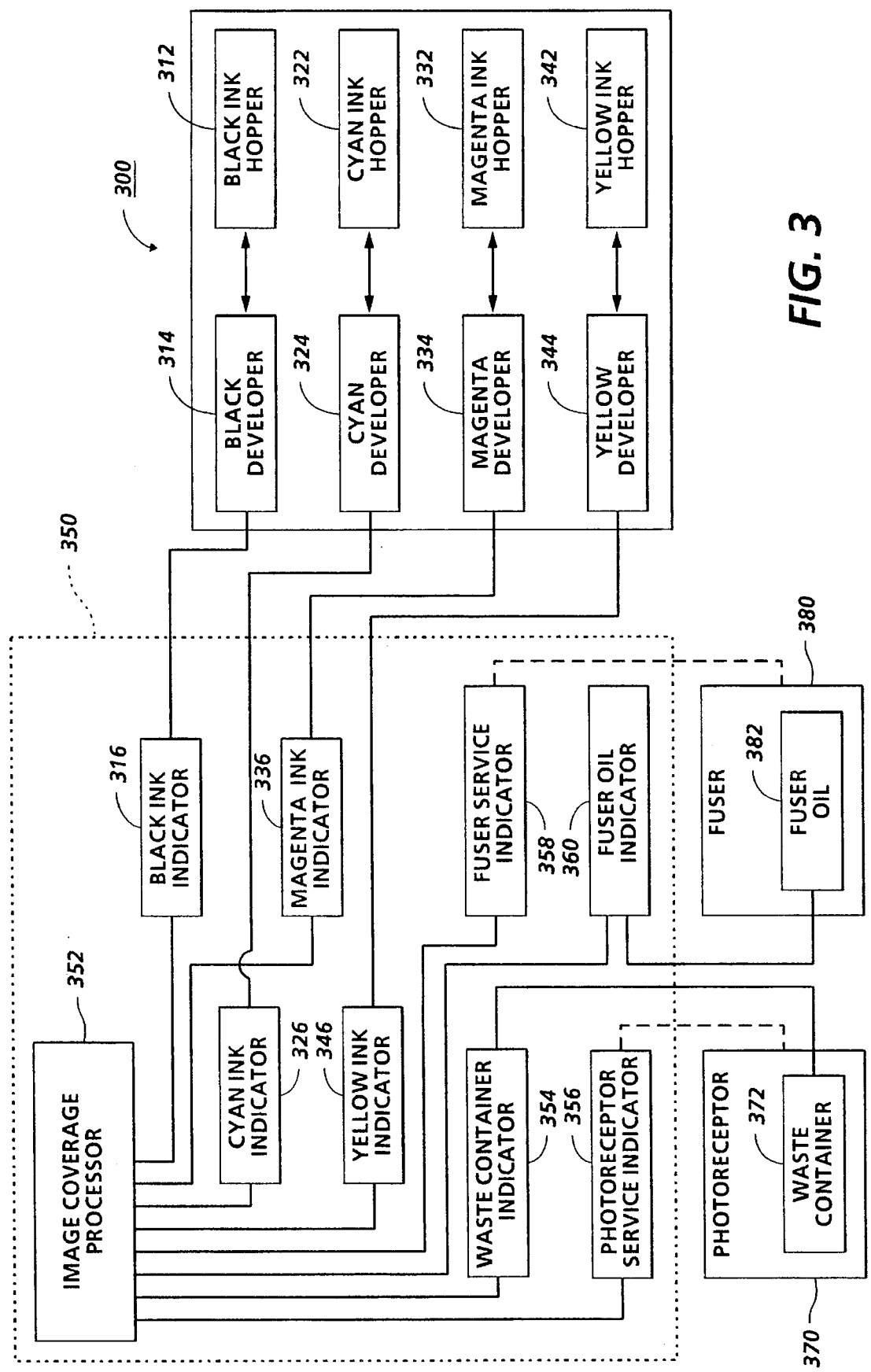
FIG. 3 is a block diagram showing another aspect of a sampling processor printer management system of the present invention.

FIG. 3 shows a block diagram of a system 300 of the present invention, in which expanded uses of the sampled and summed byte/pixel data are made in a printer. Information from processor 352 of electronic subsystem 350 is employs summed byte/pixel sampling data for a variety of purposes beyond metering inks to developer housing. For example, information from processor 352 is shown being used to indicate when developer housing, photoreceptor and/or fuser service is required, when fuser oil containers require replenishment and when waste containers must be emptied. A set of developers 310 is shown including a black ink hopper 312, a cyan ink hopper 322, a magenta ink hopper 332 and a yellow ink hopper 342, each respectively providing the required amounts of ink to, black developer 314, cyan developer 324, magenta developer 334 and yellow developer 344. According to the summed byte/pixel coverage estimation provided by processor 352 (such as shown and described in conjunction with FIGS. 1 and 2) image coverage processor 352 of FIG. 3 predicts the remaining ink supplies of each hopper. Further, processor 352 predicts the service and maintenance requirements as well as carrier particle replacement or replenishment requirements of each of the developers 314, 324, 334 and 344 of developer set 310. The status of each developer and each respective ink hopper can be accessed by the user according to the indicators in electronic system 350. The black ink indicator, represented as block 316, reports the various aspects of predicted condition of black developer 314 and black ink hopper 312; cyan ink indicator 326 predicts the cyan developer 324 and cyan ink hopper 322 conditions; magenta ink indicator 336 predicts the magenta developer 334 and magenta ink hopper 332 conditions; and yellow ink indicator 346 indicates the yellow developer 344 and yellow ink hopper 342 conditions.

In addition to the developer housing and ink hopper status indications, image coverage processor 352 also predicts fuser service requirements of fuser 380, as well as the fuser oil supply 382. In each case, the status of these aspects of printing operations are accessible to the user by fuser service indicator 358, and fuser oil level indicator 360. Likewise, the condition of photoreceptor 370 and the remaining capacity of waste container 372 associated therewith are likewise monitored. Image coverage processor 352 predicts the service and maintenance requirements of photoreceptor 370 and waste container 372, and provides users with an accessible information about those requirements according to photoreceptor service indicator 354 and waste container indicator 356.

While present invention has been described in conjunction with various embodiments, it is evident that many alternatives, modifications, and variations will be apparent to those skilled in the art. Accordingly, it is intended to embrace all such alternatives, modifications, and variations as fall within the spirit and broad scope of the appended claims.

What is claimed is:

1. An apparatus for estimating pixel coverage in a digitized image comprising:
    a controller for sampling pixels in a byte stream according to a varied spacing mode so as to avoid image pattern errors; and a processor, in communication with said controller, for summing the pixels in said sampled bytes, whereby said processor provides an estimate of a total number of pixels turned on in the digitized image.

2. The apparatus of claim 1, wherein said controller comprises a look-up table, whereby said controller selects each address for sampling bytes in said byte stream according to the look-up table.

3. The apparatus of claim 2, wherein said controller reuses said lookup table in sampling each digitized image, wherein said controller obtains each first address from the look-up table according to a new starting point during each reuse of the look-up table.

4. The apparatus of claim 1, wherein said controller comprises at least one random number generator, whereby said controller selects each address for sampling bytes in the byte stream according to said random number generator.

5. The apparatus of claim 1, further comprising a printer service status indicator for providing printer component service data, wherein said processor provides an estimate of the total number of pixels turned on to said printer service status indicator.

6. The apparatus of claim 1, wherein said controller comprises a lookup table, whereby said controller selects each address for sampling pixels within each byte according to said look-up table.

7. The apparatus of claim 1, further comprising an ink metering controller for dispensing ink to a printer, wherein said processor provides a set of ink dispensing instructions to said ink metering controller.

8. The apparatus of claim 1, further comprising:

an ink holder; and an ink level indicator for indicating a level of ink remaining in the ink holder, wherein said processor provides a set of ink use data to said ink level indicator according to said estimate of the total number of pixels turned on.

9. The apparatus of claim 1, wherein the estimation of the total number of pixels turned on determining a portion of the digitized image covered with an ink is expressed by an algorithm:

```
PY = PI
P = 0
Loop over scan lines
    PY = PY + W*y
    IF PY > (PI + W*S), then exit scan lines loop
    PX = PY
    Loop over a set of image data bytes
        PX = PX + x
        If PX > (PY + W) then exit the image data byte loop
        P = P + (number of pixels turned on in byte address
            by PX)
    End loop over image data bytes
End loop over scan lines
Image portion covered with said ink =
```

$$\frac{P}{(W/\bar{x})*(S/\bar{y})*8};$$

whereby a set of variables of the algorithm are defined as follows:

PI=a memory address of a first image data byte;

PY=a current scan line address;

PX=a current byte address;

S=a total number of scans in the digitized image;

W=a width of scan line in bytes;

P=a total number of pixels turned on;

X=a first random variable with a sample value x and a mean value $\bar{x}$, approximately uniformly distributed between:

$$\frac{1}{2}\bar{x} \text{ and } \frac{3}{2}\bar{x}; \text{ and}$$

Y=a second random variable with a sample value y and a mean value $\bar{y}$, approximately uniformly distributed between:

$$\frac{1}{2}\bar{y} \text{ and } \frac{3}{2}\bar{y}.$$

10. An apparatus for printing digitized images on sheets including a system for estimating pixel coverage in said digitized images, said system comprising:

a controller for sampling pixels in a byte stream according to a varied spacing mode so as to avoid image pattern errors; and a processor for summing said pixels in said sampled bytes, whereby said processor provides an estimate of a total number of pixels turned on in said digitized image.

11. The apparatus of claim 10, wherein said controller comprises at least one look-up table, whereby said controller selects each address for sampling bytes in said byte stream according to said look-up table.

12. The apparatus of claim 11, wherein said controller reuses said look-up table in sampling each digitized image, wherein said controller obtains each first address from the look-up table according to a new starting point during each reuse of the look-up table.

13. The apparatus of claim 10, wherein said controller comprises at least one random number generator, whereby said controller selects each address for sampling bytes in said byte stream according to said random number generator.

14. The apparatus of claim 10, wherein said controller comprises at least one look-up table, whereby said controller selects each address for sampling pixels within each byte according to said look-up table.

15. The apparatus of claim 10, further comprising a printer service status indicator for providing printer component service data, wherein said processor provides an estimate of said total number of pixels turned on to said printer service status indicator.

16. The apparatus of claim 10, further comprising a ink metering controller for dispensing ink to a printer, wherein said processor provides a set of ink dispensing instructions to said ink metering controller.

17. The apparatus of claim 10, further comprising a ink level indicator for indicating a level of ink remaining in an ink holder, wherein said processor provides a set of ink use data to said ink level indicator according to said estimate of the total number of pixels turned on.

18. The apparatus of claim 10, wherein the estimation of the total number of pixels turned on for determining a portion of the digitized image covered with an ink is expressed by an algorithm:

```
PY = PI
P = 0
Loop over scan lines
    PY = PY + W*y
    IF PY > (PI + W*S), then exit scan lines loop
    PX = PY
    Loop over a set of image data bytes
        PX = PX + x
        If PX > (PY + W) then exit the image data byte loop
        P = P + (number of pixels turned on in byte address
            by PX)
    End loop over image data bytes
End loop over scan lines
```

-continued

Image portion covered with said ink =

$$\frac{P}{(W/\bar{x})*(S/\bar{y})*8};$$

whereby a set of variables of the algorithm are defined as follows:

PI=a memory address of a first image data byte;
PY=a current scan line address;
PX=a current byte address;
S=a total number of scans in the digitized image;
W=a width of scan line in bytes;
P=a total number of pixels turned on;
X=a first random variable with a sample value x and a mean value $\bar{x}$, approximately uniformly distributed between:

$$\frac{1}{2}\bar{x} \text{ and } \frac{3}{2}\bar{x}; \text{ and}$$

Y=a second random variable with a sample value y and a mean value $\bar{y}$, approximately uniformly distributed between:

$$\frac{1}{2}\bar{y} \text{ and } \frac{3}{2}\bar{y}.$$

19. A method for estimating pixel coverage in a digitized image comprising:
   sampling pixels in a byte stream according to a varied spacing mode so as to avoid image pattern errors; and
   summing said pixels in said sampled bytes, whereby said processor provides an estimate of a total number of pixels turned on in said digitized image.

20. The method of claim 19, further comprising using a look-up table to select each address of said bytes sampled in said byte stream.

21. The method of claim 20, further comprising:
   using a look-up table to sample each digitized image; and
   entering the look-up table at a new starting address to begin each reuse of the look-up table.

22. The method of claim 19, comprising using a random number generator to select each address of said bytes sampled in said byte stream.

23. The method of claim 19, comprising using a look-up table to select each pixel address for sampling pixels within said byte.

24. The method of claim 19, comprising providing the estimated total number of pixels turned on to a printer service status indicator for indicating the status of a set of printer components.

25. The method of claim 19, comprising providing a set of ink metering instructions to an ink metering controller for dispensing ink to a printer, with the ink dispensing instructions being developed according to the estimate of the total number of pixels turned on.

26. The method of claim 19, wherein the estimation of the total number of pixels turned on performed according to the steps:

```
PY = PI
P = 0
Loop over scan lines
    PY = PY + W*y
    IF PY > (PI + W*S), then exit scan lines loop
    PX = PY
    Loop over a set of image data bytes
        PX = PX + x
        If PX > (PY + W) then exit the image data byte loop
        P = P + (number of pixels turned on in byte address
             by PX)
    End loop over image data bytes
End loop over scan lines
```

Image portion covered with said ink =

$$\frac{P}{(W/\bar{x})*(S/\bar{y})*8};$$

whereby a set of variables of the steps are defined as follows:

PI=a memory address of a first image data byte;
PY=a current scan line address;
PX=a current byte address;
S=a total number of scans in the digitized image;
WW=a width of scan line in bytes;
P=a total number of pixels turned on;
X=a first random variable with a sample value x and a mean value $\bar{x}$, approximately uniformly distributed between:

$$\frac{1}{2}\bar{x} \text{ and } \frac{3}{2}\bar{x}; \text{ and}$$

Y=a second random variable with a sample value y and a mean value $\bar{y}$, approximately uniformly distributed between:

$$\frac{1}{2}\bar{y} \text{ and } \frac{3}{2}\bar{y}.$$

* * * * *